Aug. 22, 1939.  A. B. JOHNSON  2,170,687
TILTABLE CUTTER UNIT
Filed May 16, 1938   2 Sheets-Sheet 1
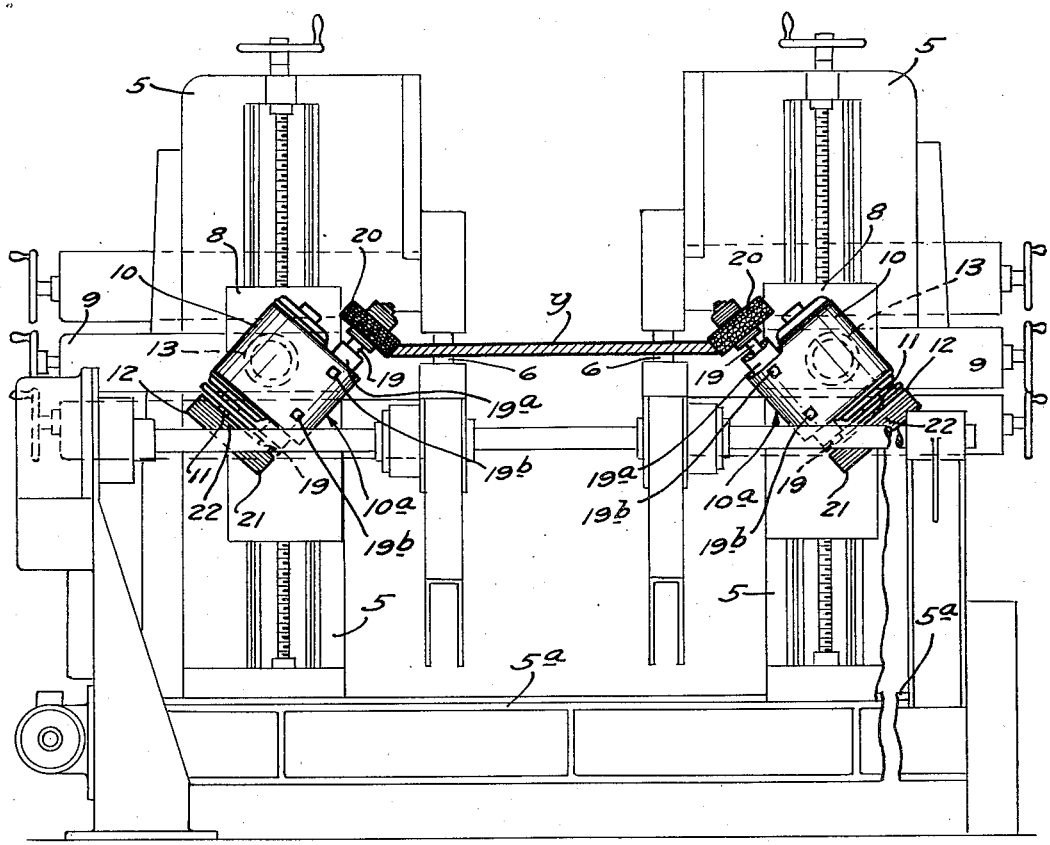
Fig. 1
Fig. 4
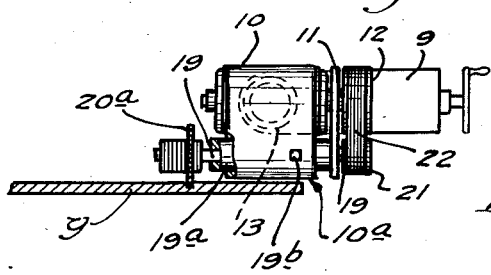
Inventor
Arthur B. Johnson
By his Attorneys Aug. 22, 1939.  A. B. JOHNSON  2,170,687
TILTABLE CUTTER UNIT
Filed May 16, 1938  2 Sheets-Sheet 2
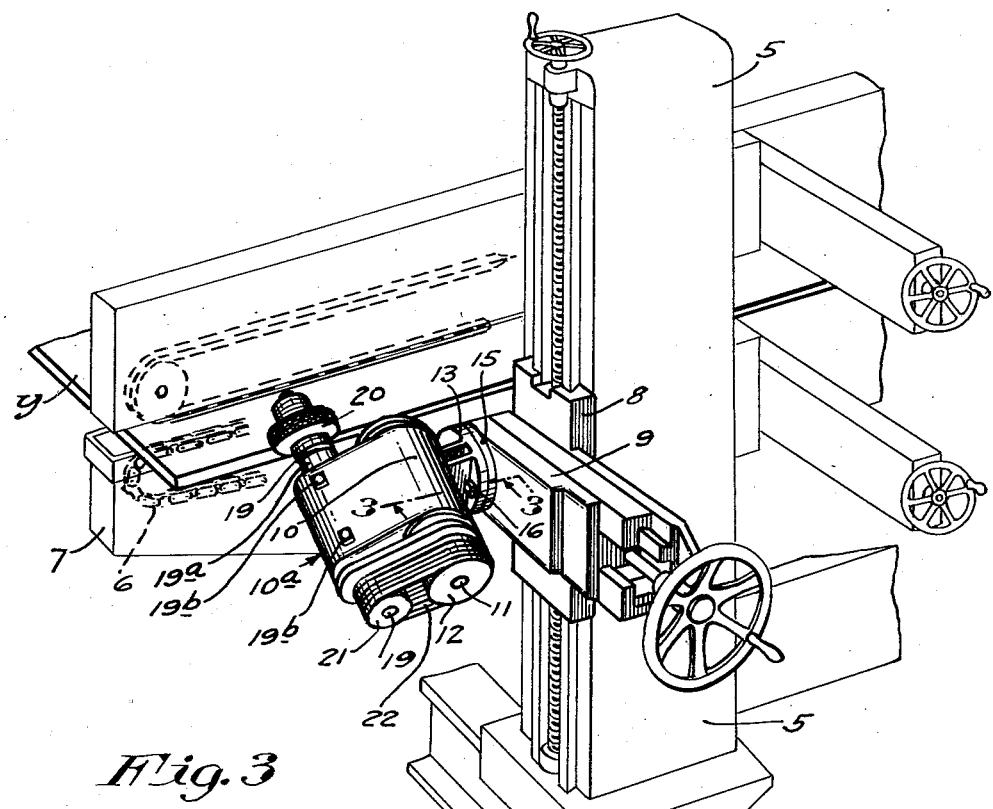
Fig. 2
Fig. 3
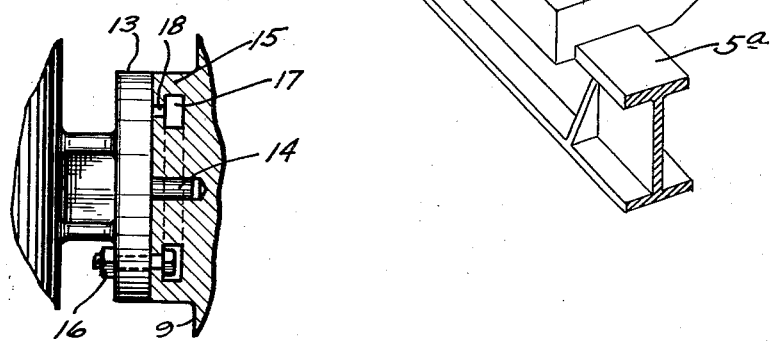
Inventor
Arthur B. Johnson
By his Attorneys Patented Aug. 22, 1939

2,170,687

UNITED STATES PATENT OFFICE 2,170,687

TILTABLE CUTTER UNIT

Arthur B. Johnson, Minneapolis, Minn.

Application May 16, 1938, Serial No. 208,114

1 Claim. (Cl. 144—134)

My present invention relates to wood working machines and particularly to that class of machines known as "edge trimmers" and sometimes designated as "double end or edge tenoner".

Machines of the above type are designed to cut or finish the edges by bevelling, forming tenons, mortices, or the like thereon. For this various kinds of work various kinds of edge-forming wheels or tools may be used, all of which are hereinafter designated broadly as "cutting wheels."

Hitherto such cutting wheels or tools have been applied directly to the rotor shafts of electric motors and the motors have been mounted for vertical, horizontal, and angular pivotal movements. In these old arrangements for the cutting of different kinds of wood, varying speeds of the motor have been required and this has been accomplished by the use of frequency changers which are expensive and otherwise objectionable. Moreover, in the old arrangement, the relatively large diameter of the motor casing is made necessary the use of cutting wheels of large diameter not only to get the desired peripheral speed, but to get clearance between the motor casing and the board, the edge or near edge of which is being cut or formed. The large diameter cutter wheels are not only expensive but are liable to be broken or "exploded" by centrifugal force when driven at high velocity.

The best cutting action can be obtained by the use of small cutting wheels because their cutting zone in the wood is of a smaller arc than with larger cutting wheels and the "back" rake of a cutting wheel, especially in soft woods, is much better than that of the relatively large cutting wheels. In my improved arrangement, the motor casing is provided with a lateral extension which is decreased in diameter to such an extent that it is only large enough to support an arbor; an arbor is mounted in this reduced extension of the motor casing; the cutting wheel or tool is applied to one end of the said arbor; and the other end of said arbor is driven from the motor shaft by means of a belt and pulley drive. The belt and pulley drive consists of a relatively large and a relatively small pulley and driving belt. The pulleys are preferably multi-grooved pulleys and the belt is made up of a multiplicity of parallel belts. For high speed of the cutting wheel the large pulley is applied on the motor shaft and the small pulley is applied on the arbor; but for reduced speed, the pulleys may be interchanged, that is, the large pulley applied to the arbor and the small pulley to the motor shaft.

The cutting wheel or tool may take various forms according to the design or shape to be given to the edge of the board. For example, the cutting wheels may be arranged to bevel the edge of a board, to cut a mortice or groove in or adjacent to the edge of the board, to cut a rabbet in the edge of the board, or to form ornamental edges such as required for the edges of tables or other articles of furniture, door rails, and the like.

My invention eliminates the various above noted disadvantages or objectionable features and accomplishes the various desired objects by an extremely simple design and arrangement.

The invention above generally indicated is illustrated in the accompanying drawings wherein like characters indicate like parts throughout the several views.

Referring to the drawings:

Fig. 1 is an elevation showing the wood working machine of the type known as a double edge or end trimmer and which I have in the trade designated as a "double end tenoner", some parts being broken away and showing in transverse section a board being trimmed;

Fig. 2 is a perspective showing a part of the machine illustrated in Fig. 1;

Fig. 3 is a detail partly in plan and partly in section on the line 3—3 of Fig. 2 and Fig. 4 is a detail chiefly in elevation but with some parts sectioned showing the adjustment of the motor and parts carried thereby for cutting a groove at a distance from the edge thereof.

The parts of the machine proper are of such well known construction that they may be briefly noted as follows: the machine being a double end or edge trimmer, two columns 5 are mounted on the cross beams of a common frame 5a for movements by one of the columns toward or from the other. The boards y that are to be trimmed are fed endwise by power-driven feed belts 6 mounted on frame 7. Mounted for vertical sliding movements on the columns 5 are primary slides 8 and mounted for horizontal sliding movements on the vertically movable slides 8 are secondary slides 9. The means for imparting the respective movements to the said slides 8 and 9 form no part of the present invention, are of standard and well known construction, and hence, though illustrated in the drawings, are not here specifically described.

The numeral 10 indicates the casing of an electric motor, the rotor shaft 11 of which is projected and provided with a driving pulley 12 which is preferably of the multi-groove type. At one side the motor casing 10 is provided with an off-set disc-like bearing plate 13 that is rotatively mounted on the co-operating secondary slide 9. As best shown in Fig. 3, the bearing plate 13 is provided with an axial trunnion 14 that is seated in a boss 15 of the slide 9. Said plate 13 is further pivotally secured to the boss 15 by nut-equipped bolts 16 that pass through said plate with their heads working in an annular channel 17 of said boss and with their stems working through annular grooves 18 in the face of said boss. In this way the motor casing is mounted for angular adjustments in a vertical plane and obviously by adjustments of the primary and secondary slides 8 and 9, may be properly adjusted vertically and toward and from the edges of the board y.

The motor casing 10 is laterally extended and contracted, as shown at 10a, and extended through and journaled therein is a wheel-carrying spindle 19 which, at its forwardly projecting end, is provided with the cutting wheel 20. At its other end the spindle 19 carries a driven pulley 21 which, to correspond with the driving pulley 12, is also preferably a multi-grooved pulley.

Running over the pulleys 12 and 21 is a driving belt preferably made up of a plurality of belts indicated at 22.

Fig. 4 illustrates the importance of mounting the cutter shaft or spindle in a laterally extended reduced portion of the motor casing so that a cutter wheel of smaller diameter than the diameter of the main armature-enclosing body of the casing may be used. Obviously the wheel of the diameter shown in Fig. 4 applied to the motor shaft could not be used to perform work such as shown in Fig. 4.

It is important to note that in this improved machine wherein the boards are fed edgewise in a horizontal direction, the motor casing is mounted for vertical, transverse and pivotal movements in a vertical plane that is at right angles or approximately right angles to the line of feed of the boards. Also that the reduced portion of the casing in which the spindle is mounted depends therefrom so that the device can be used as shown in Fig. 4 to cut grooves in a board with a cutting wheel or tool that is of less diameter than the diameter of the main or armature-enclosing body of the casing. The cutting wheel illustrated in Fig. 4 is narrower than the cutting wheel 20 of Figs. 1, 2 and 3, and is indicated by the character 20a.

For the purpose of providing a convenient and highly efficient method of adjustably varying the tension on the belts 22 the spindle 19 is journaled in the reduced diameter portion of the motor casing 10 through the medium of a bearing sleeve 19a. The bearing sleeve 19a is rotatively mounted in the motor casing and the spindle 19 is eccentrically journaled in the bearing sleeve so that under adjustable rotation of the bearing sleeve, the spacing between the pulleys 12 and 21 will be varied. For locking the bearing sleeve in desired adjustable positions there is provided lock nuts 19b.

In actual commercial practice the efficiency of the device herein disclosed has been demonstrated.

What I claim is:

In a machine of the class described, means for feeding boards edgewise in a horizontal direction, in combination with an electric motor involving a casing and an armature therein, said casing being mounted for vertical, lateral and pivotal adjustments in a vertical plane that is approximately at a right angle to the line of feed of said boards, said casing having a depending portion of materially less diameter than the armature-enclosing body of said casing, a spindle mounted in said reduced portion with its axis approximately a parallel to the axis of the armature, said spindle at one projecting end having a cutting wheel or tool, and transmission means connecting the other end of said spindle to said armature.

ARTHUR B. JOHNSON.